United States Patent
Khojastepour et al.

(10) Patent No.: US 10,298,671 B2
(45) Date of Patent: May 21, 2019

(54) RANDOMIZATION FUNCTION AND ITS APPLICATION IN LOAD BALANCING

(71) Applicant: NEC Laboratories America, Inc., Princeton, NJ (US)

(72) Inventors: Mohammad Khojastepour, Lawrenceville, NJ (US); Rajesh Mahindra, Sunnyvale, CA (US); Karthikeyan Sundaresan, Manalapan, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 359 days.

(21) Appl. No.: 15/340,768

(22) Filed: Nov. 1, 2016

(65) Prior Publication Data

US 2017/0126798 A1    May 4, 2017

Related U.S. Application Data

(60) Provisional application No. 62/250,053, filed on Nov. 3, 2015.

(51) Int. Cl.
*H04L 29/08* (2006.01)

(52) U.S. Cl.
CPC ...... *H04L 67/1027* (2013.01); *H04L 67/1008* (2013.01); *H04L 67/1019* (2013.01)

(58) Field of Classification Search
CPC ..... H04L 63/04; H04L 51/28; H04L 67/1008; H04L 67/1019; H04L 67/1027

USPC .......................................................... 709/226
See application file for complete search history.

(56) References Cited

U.S. PATENT DOCUMENTS

| 9,491,112 | B1* | 11/2016 | Patel | H04L 47/70 |
| 2016/0292011 | A1* | 10/2016 | Colson | G06F 9/5044 |
| 2016/0321100 | A1* | 11/2016 | Jones | G06F 9/46 |

OTHER PUBLICATIONS

DeCandia, et al., "Dynamo: Amazon's Highly Available Key-value Store", Amazon.com, OSP'07, Oct. 2007, pp. 205-220.

\* cited by examiner

*Primary Examiner* — Tu T Nguyen
(74) *Attorney, Agent, or Firm* — Joseph Kolodka (57) ABSTRACT

A load balancing device and method are provided. The load balancing device includes a processor. The processor is configured to receive a plurality of tasks from a plurality of user devices, each of the plurality of tasks involving a respective one of multiple sets of sessions. The processor is further configured to generate a task ID for each of the plurality tasks using a randomization function, at least one task ID for at least one of the plurality of tasks changing over time responsive to one or more criterion. The processor is additionally configured to allocate the plurality of tasks amongst a set of worker entities such that all the sessions involved in the plurality of tasks received from a respective same one of the plurality of user devices is assigned to a same one of the worker entities in the set.

10 Claims, 6 Drawing Sheets

Receive, by a load balancer, a plurality of tasks from a plurality of user devices, each of the plurality of tasks involving a respective one of multiple sets of sessions.
510

Generate, by the load balancer, a task ID for each of the plurality tasks using a randomization function, at least one task ID for at least one of the plurality of tasks changing over time responsive to one or more criterion.
520

Allocate, by the load balancer, the plurality of tasks amongst a set of worker entities such that all the sessions involved in the plurality of tasks received from a respective same one of the plurality of user devices is assigned to a same one of the worker entities in the set.
530

RANDOMIZATION FUNCTION AND ITS APPLICATION IN LOAD BALANCING

RELATED APPLICATION INFORMATION

This application claims priority to 62/250,053 filed on Nov. 3, 2015, incorporated herein by reference in its entirety.

BACKGROUND

Technical Field

The present invention relates to load balancing and more particularly load balancing on networks.

Description of the Related Art

Load balancing arises in different context, where a task may be performed by multiple workers and the load balancer assigns task to each worker such that their load is balanced. If all the workers have the same capability, as is usually the case, load balancing refers to uniform or almost uniform distribution of the task to the workers. In some other cases, for example, proportional distribution of the load is desirable or the load distribution could be a function of the worker's capabilities. A load balancer is the entity which performs this task.

SUMMARY

According to an aspect of the present principles, a load balancing device is provided. The load balancing device includes a processor. The processor is configured to receive a plurality of tasks from a plurality of user devices, each of the plurality of tasks involving a respective one of multiple sets of sessions. The processor is further configured to generate a task ID for each of the plurality tasks using a randomization function, at least one task ID for at least one of the plurality of tasks changing over time responsive to one or more criterion. The processor is additionally configured to allocate the plurality of tasks amongst a set of worker entities such that all the sessions involved in the plurality of tasks received from a respective same one of the plurality of user devices is assigned to a same one of the worker entities in the set.

According to another aspect of the present principles, a method is provided that is performed in a load balancer. The method includes the load balancer receiving a plurality of tasks from a plurality of user devices, each of the plurality of tasks involving a respective one of multiple sets of sessions. The method further includes the load balancer generating a task ID for each of the plurality tasks using a randomization function, at least one task ID for at least one of the plurality of tasks changing over time responsive to one or more criterion. The method also includes the load balancer allocating the plurality of tasks amongst a set of worker entities such that all the sessions involved in the plurality of tasks received from a respective same one of the plurality of user devices is assigned to a same one of the worker entities in the set.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In accordance with the present invention, systems and methods are provided for load balancing over a network.

It is sometimes desirable for a server load balancer (SLB) to assign a task belonging to the same user or entity to the same worker or worker entity (MMP), which can be an entire server and any subset of a server including a single thread or a virtual machine installation. This particular characteristic of load-balancing is extremely useful for stateful applications. In traditional applications, the load balancers simply assign a task to a random worker or the most-lightly loaded worker. The worker assigned to a task subsequently pulls data of the associated user or entity from an independently managed database or storage and processes the request from the task. Hence, at different times, different workers may process the task(s) from the same user or entity. On the other hand, for stateful applications, it is better to cache the data of a user or entity on a particular worker and select the same worker to process the tasks of the user or entity. For instance, in certain cloud applications, tasks such as user authentication, credit card processing, shopping carts, etc., re-scheduling the tasks of the same user across different workers requires movement and consistency management of the associated data or state of the user in the database, leading to complex design and inefficiencies. More importantly, in the context of virtualized telecom services, such load balancing characteristics are critical, since most of the telecom sessions are sticky and persistent. For instance, in the context of LTE evolved packet core, the Mobility Management Entity (MME) processes the control-plane traffic. Once a device registers with the network, an associated state (device specific data) is stored in the MME system. Every time, the device re-connects with the network or moves across base stations, its requests have to be processed by the MME using the user's state. Having the ability of a load-balancer to schedule the tasks or requests of a particular device to the same MME Virtual Machine (VM) saves the requirement of designing a distributed database with consistency requirements. Moreover, the state associated with a user in telecom services is relatively small (in few MBytes) and it is inefficient to pull and push this data between the workers and the database every time a request or task is received from the device.

In the context of stateful applications, there are a number of other properties that are desirable for the SLB in different scenarios. One property is that a task might have a different referral in time, i.e., a new task or reactivation of task might happen for an old task and all referrals need to be assigned to the same worker. Another property is that the number of workers may change in time. This means that workers may retire, go offline for a period before coming back online, or be added to a pool of workers. Also, in some scenarios it may be desirable to have a backup worker (or multiple backup workers) on standby for a task, which means that the backup worker knows the task and can pick it up when needed.

One critical requirement is to avoid using persistent or the same task IDs for a long duration of time to avoid attacks and protect privacy. Each task has an ID that is valid for a length of a time and it may change over time. However, the same task or its referrals should always go to the same worker (or possibly one or more backup workers based on one or more requirements) that is currently assigned to handle the task. Hence, it is desirable to have a task ID that is random, i.e., a task ID that makes it not possible to derive a valid task ID from another task ID or collection of task IDs.

A task may comprise of multiple transactions or sessions. All the transactions or sessions belonging to the same task should usually be assigned to the same worker. Each transaction may have different ID. In some scenarios, a transaction may have a fixed ID which does not change over time while another transaction of the same user may have an ID that is required to change over time. It is important for the load balancer to direct all the transactions from the same user to the same worker.

In one embodiment, the SLBs or the server load balancers do not need to store a table or a perform look-up to schedule each task or transaction within a task. This ensures that the SLBs are light-weight and can be effectively scaled-in and out. The key idea is useful in the context of MMEs in LTE networks. Consider a scenario with a pool of workers denoted by MMPs (VMs) that process tasks scheduled by multiple server load balancers (SLBs) such as SLB1 or SLB2. Either of SLB1 or SLB2 may be referred to as SLB. Each MMP VM maintains and processes the task from specific users (UEs) that are assigned to it. However, for each user (UE), the MMP VM has a corresponding transaction or session with the Serving Gateway (SGW), an LTE base station (eNodeB) and the Home Subscriber Service (HSS). The SLB needs to make sure that the different sessions from the SGW, the HSS and the eNodeB for the same UE or device (same task) are mapped to the same MMP VM. This ensures that the UE state or context can be maintained at a particular MMP VM and that the VM processes the task(s) for the UE.

Figure 1:
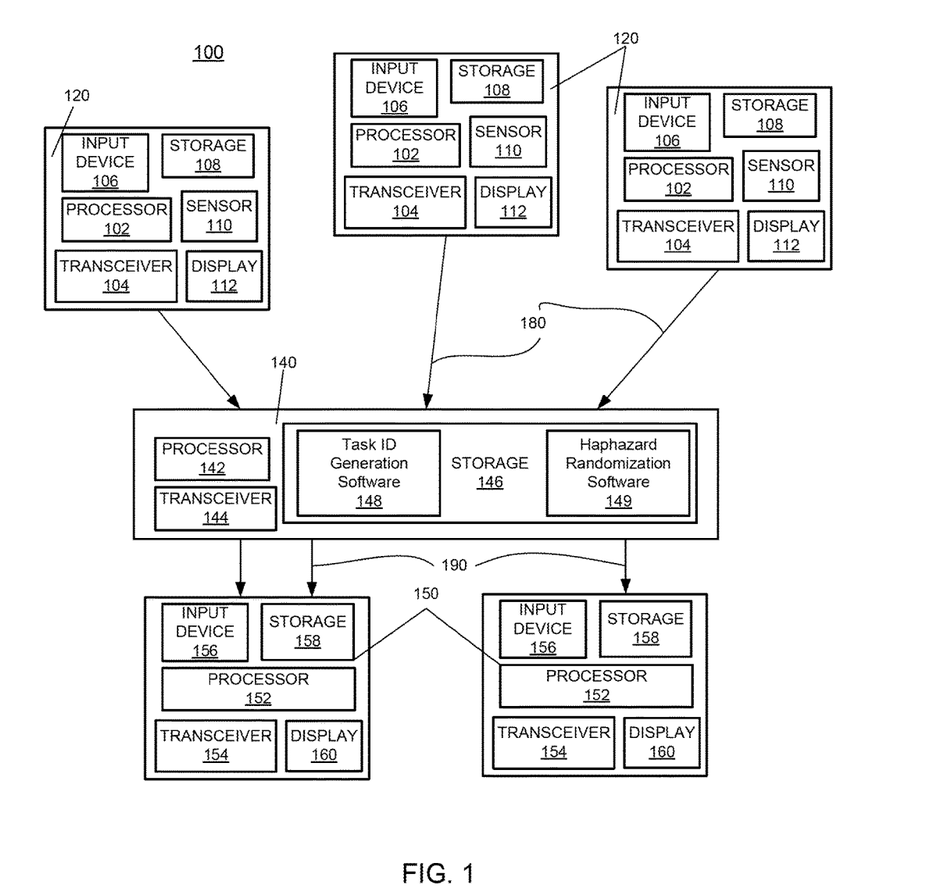
FIG. 1 is a block diagram illustrating a high-level system for a network, in accordance with an embodiment of the present invention.

Referring now in detail to the figures in which like numerals represent the same or similar elements and initially to FIG. 1, a high-level system for load balancing over a network 100 is illustratively depicted in accordance with one embodiment of the present invention. The network 100 includes more than one user device 120. In one embodiment, the user device 120 may include a mobile device, a cell phone, a personal computer, a data center or any combination of these and other networkable items.

The user device 120 may include one or more processors 102. The processor 102 could process sensor or input data of the user device 120. The processor 102 could process the data received by the user device 120 from another user device 120. The user device 120 may include one or more displays 112. The user device 120 may include one or more input devices 106. The input device could be used to accept user commands or data into the user device 102.

The user device 120 may include one or more sensors 110 for making different measurements. The measurements may include gas concentration, pressure, temperature, wind speed, wind direction, speed, acceleration, etc. In an embodiment, the sensor 110 may include one or more of the following: an optical sensor; an infrared (IR) sensor; a camera; an accelerometer or other motion sensor; an electrochemical gas sensor or other gas sensor; a thermocouple; a thermistor; a resistance thermometer; a silicon bandgap temperature sensor or other temperature sensor; and so forth.

The user device 120 may include a transceiver 104. In one embodiment, the transceiver 104 may be coupled to a global position system (GPS) to determine a position of the user device 120 relative to other user devices 120 on a common coordinate system. The transceiver 104 may be equipped to communicate with a cellular network system. In this way, the user device 120 can communicate with anything that is connected to the cellular network, such as, e.g., but not limited to, the Internet. In one embodiment, the cellular network system may be the communication link between the user devices 120. In another embodiment, the cellular network system may be the communication link 180 between the user device 120 and the load balancer 170 of the cellular network. The transceiver 104 may include a WIFI or other radio system, a local area network, a wide area network, and so forth.

The user device 120 may include memory storage 108. The memory storage 108 may include solid state or soft storage and work in conjunction with other systems on the user device 120 to record data, run algorithms or programs, control the user device, etc. The memory storage 108 may include a Read Only Memory (ROM), random access memory (RAM), or any other type of memory useful for the present applications.

The network 100 includes at least one load balancer 140. The load balancer 140 may include one or more processors 142. The processor 142 could process sensor or input data from a user device 120. The processor 142 could process the data received by the load balancer 140 from another load balancer 140.

The load balancer 140 may include memory storage 146. The memory storage 146 may include solid state or soft storage and work in conjunction with other systems on the load balancer 140 to record data, run algorithms or programs, control the load balancer 140, etc. The memory storage 146 may include a Read Only Memory (ROM), random access memory (RAM), or any other type of memory useful for the present applications. In one embodiment, the memory storage 146 make include task ID generation software 148. In another embodiment, the memory storage 146 may include haphazard randomization software 149.

The load balancer 140 may include a transceiver 144. In one embodiment, the transceiver 144 may be equipped to communicate with a cellular network system. In this way, the load balancer 140 can communicate with anything that is connected to the cellular network, such as, e.g., but not limited to, the Internet. In one embodiment, the cellular network system may be the communication link 180 between the user device 120 and the load balancer 140 of the cellular network. The transceiver 144 may include a WIFI or other radio system, a local area network, a wide area network, and so forth.

The network 100 includes more than one worker 150. In one embodiment, the worker 150 may include a mobile device, a cell phone, a personal computer, a data center or any combination of these and other networkable items. In another embodiment, the worker 150 may include a virtual machine or a thread on a processor on a computer system or server.

The worker 150 may include one or more processors 152. The processor 152 could process sensor or input data of the worker 150. The processor 152 could process the data received by the worker 150 from a load balancer 140. The worker 150 may include one or more displays 160. The worker 150 may include one or more input device 156. The input device could be used to accept user commands or data into the worker 150.

The worker 150 may include a transceiver 154. In one embodiment, the transceiver 104 may be equipped to communicate with a cellular network system. In this way, the worker 150 can communicate with anything that is connected to the cellular network, such as, e.g., but not limited to, the Internet. In one embodiment, the cellular network system may be the communication link between the workers 150. In another embodiment, the cellular network system may be the communication link 190 between the worker 150 and the load balancer 140 of the cellular network. The transceiver 104 may include a WIFI or other radio system, a local area network, a wide area network, and so forth.

The worker 150 may include memory storage 158. The memory storage 158 may include solid state or soft storage and work in conjunction with other systems on the worker 150 to record data, run algorithms or programs, control the user device, etc. The memory storage 158 may include a Read Only Memory (ROM), random access memory (RAM), or any other type of memory useful for the present applications. In one embodiment, the memory storage 158 make include task ID generation software. In another embodiment, the memory storage 158 may include haphazard randomization software.

Figure 2:
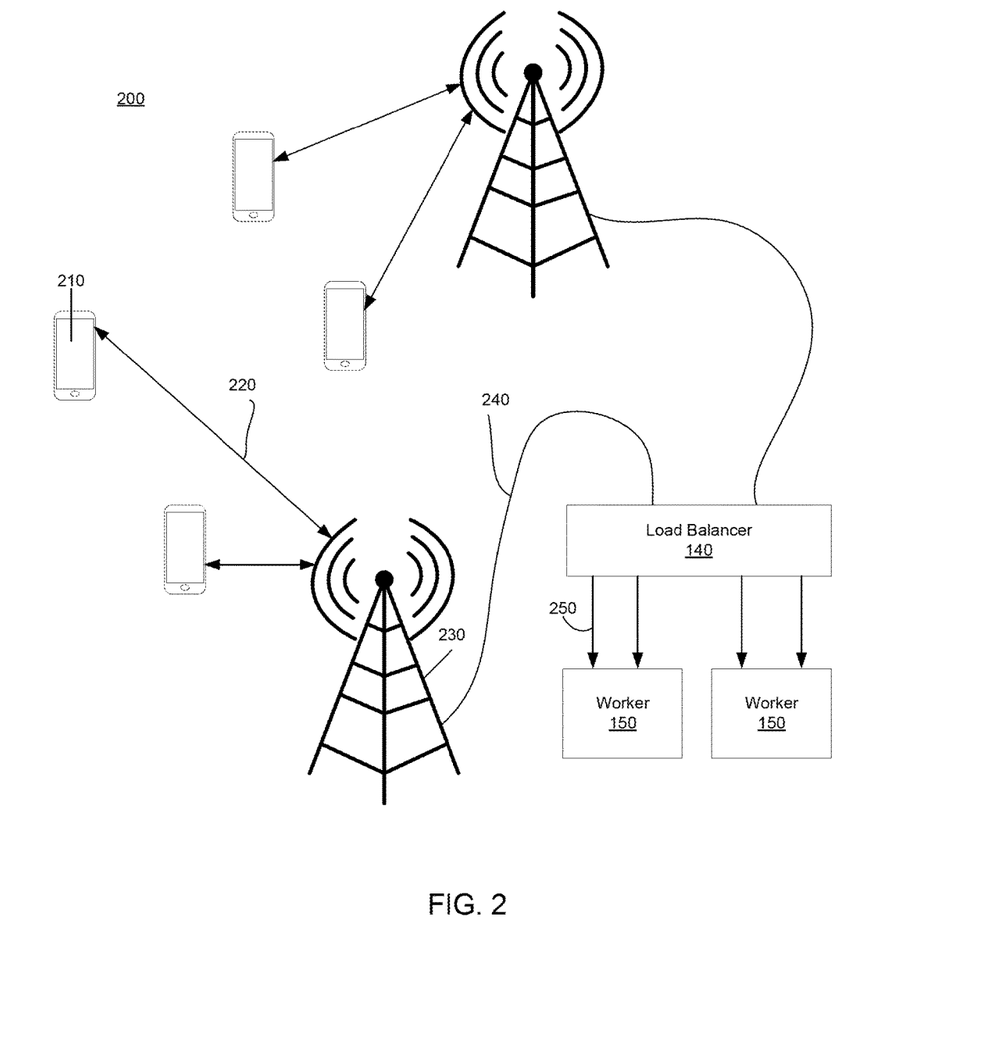
FIG. 2 is a block diagram illustrating a system for cell phones connected in a network, in accordance with an embodiment of the present invention.

Referring to FIG. 2, a network system 200 is illustratively depicted, in accordance with an embodiment of the present invention. The network system 200 may include a cell phone 210. The cell phone 210 may send data and information over a communication link 220. The communication link 220 may include a cellular based or a WIFI based link. The cell phone 210 is communicating with a cellular tower 230. The information or data sent from the cell phone 210 to the cellular tower 230 is transmitted by another communication link 240 to a load balancer 140. The load balancer 140 routes the information or data over the final communication link 250 to a worker 150. The worker 150 processes the information or data from the cell phone 210.

Figure 3:
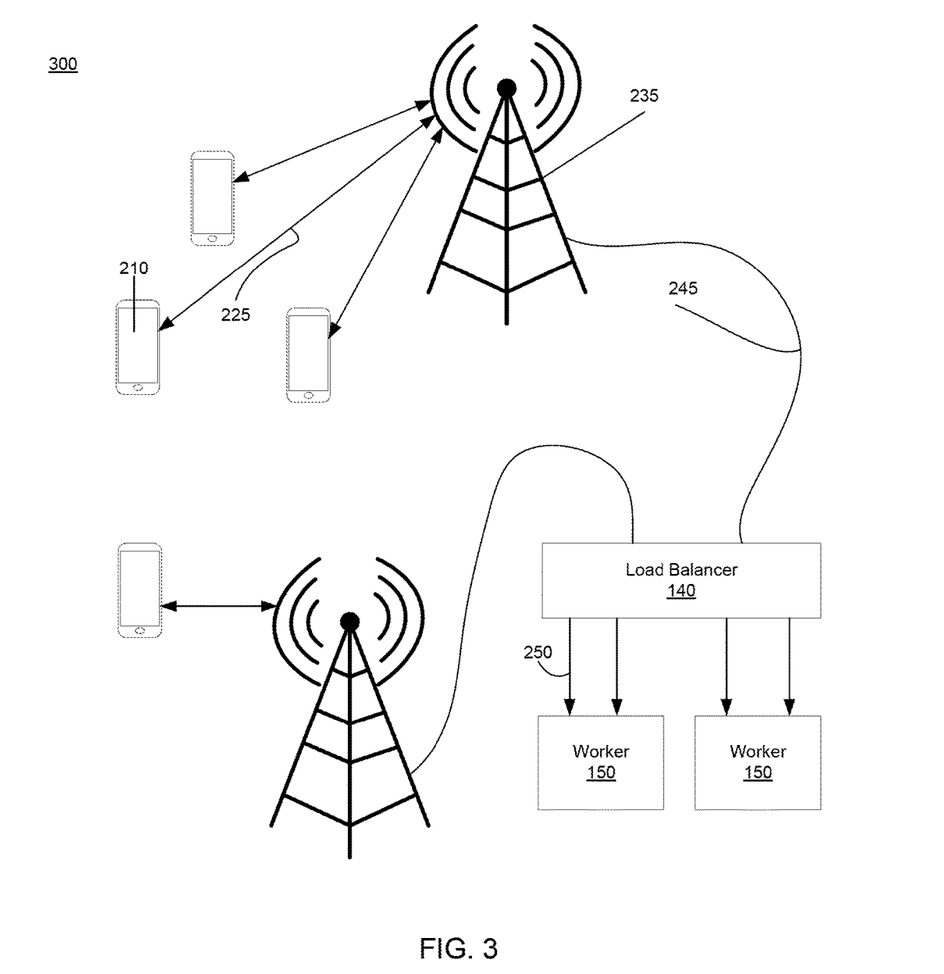
FIG. 3 is a block diagram illustrating a system for cell phones connected in a network after a cell phone moves towers, in accordance with an embodiment of the present invention.

Referring to FIG. 3, a new network system 300 is illustratively depicted, in accordance with an embodiment of the present invention. The new network system 300 is the network based on the network system 200 after the cell phone 210 moves closer to cellular tower 235. Now the cell phone 210 is communicating with cellular tower 235 thru a communications link 225. The cell phone 210 is sending information or data to the cellular tower 235. The information or data sent from the cell phone 210 to the cellular tower 235 is transmitted by another communication link 245 to a load balancer 140. The load balancer 140 routes the information or data over the final communication link 250 to a worker 150. This is the same worker 150 that processed the information or data from the cell phone 210 on network system 200 even though it came from a different cellular tower 235.

In one embodiment, a connection is initiated between a user and a worker in which a particular task is going to be persistently performed in time. There might be multiple transactions or sessions related to this user which have to be processed differently. All such sessions should be handled by the same worker which has access to the context or the state of the user.

Figure 4:
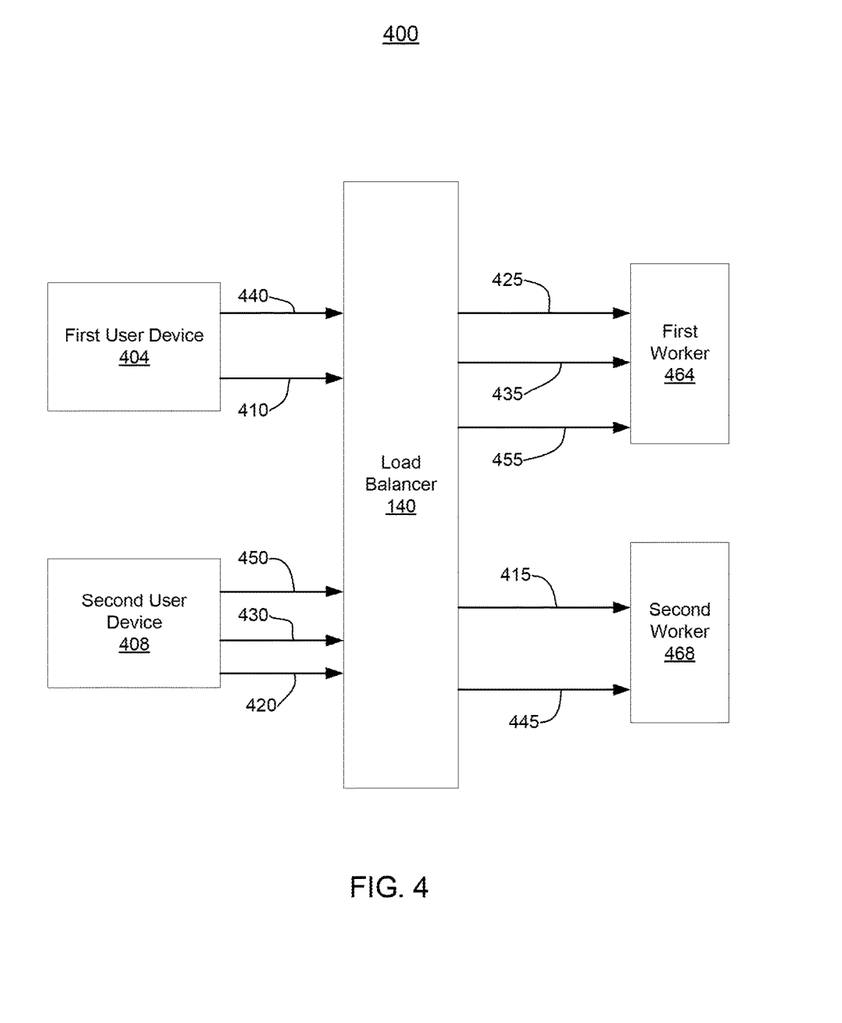
FIG. 4 is a block diagram illustrating a system for tasks on a network, in accordance with an embodiment of the present invention.

Referring to FIG. 4, a network system 400 is illustratively depicted, in accordance with an embodiment of the present invention. The network system 400 has two user devices 404 and 408, a load balancer 140, and two workers 464 and 468. Both user devices 404 and 408 are sending tasks to the load balancer 140. The load balancer 140 is sending work to the two workers 464 and 468. The first user device 404 sends a first task 410 to the load balancer 140. The load balancer sends a first work 415 to the second worker 468. The second user device 408 sends a second task 420 and a third task 430 to the load balancer 140. The load balancer 140 sends a second work and a third work 435 to a first worker 464, keeping all the work for the second user device 408 on the first worker 464. The first user device 404 sends a fourth task 440 to the load balancer 140. The load balancer sends a fourth work to the second worker 468, keeping all the work from the first user device 404 on the second worker 468. Finally the second user device 408 sends a fifth task 450 to the load balancer 140. The load balancer 140 sends a fifth work 455 to the first worker 464, keeping all the work from the second user device 408 on the first worker 464.

Each session of a task may be assigned different IDs. However, all the session ID(s) of the same task must map or hash to the same worker. Due to security or privacy of the users, or their related task, the session ID(s) may be required to change in particular time intervals. Also, some session ID(s) may be desirable to be constant for the whole life of the session, or change at different intervals. For the same reason, another desirable property is that the session IDs should not reveal the identity of the user or be able to be traced back in time, which means that a third party should not be able to generate a valid session ID irrespective of knowing or not knowing any number of prior session IDs.

All the session IDs for a particular task type across the pool of users should be unique. This means that for a given type of session, the session ID for any two users are always different.

The following procedure may be used to generate session IDs that are random (and secure) but bound together. The main idea is to use a token (pTEID), and then randomize it with different keys to get different session IDs. It is also possible to append the token with some extra bits and then randomize the result. In this case, it is possible to change the extra bits and hence get different types of session IDs, (GUTI or MME-S1AP-id in MMES), by using the same key. This can be also used to generate session IDs that are changing in time.

It is clear that by generating the GUTI based on the pTEID, two properties are simultaneously satisfied: (1) Given that fact that the haphazard function (HAPH) generates an output that is very different from the inputs, even when two similar input sequences are fed into the HAPH, therefore the pTEID looks very random even though we are using a timer and the ID of the SLB as inputs into the HAPH function; (2) Two different session IDs (GUTIs), that are generated based on the same pTEID are not only random and quite different, but also they can be traced back to the users that they belong to. Therefore the session would be sent to the proper worker by the SLB. The reason is that the GUTI can be de-randomized by using the inverse of the HAPH function and then the pTEID is extracted.

Figure 5:
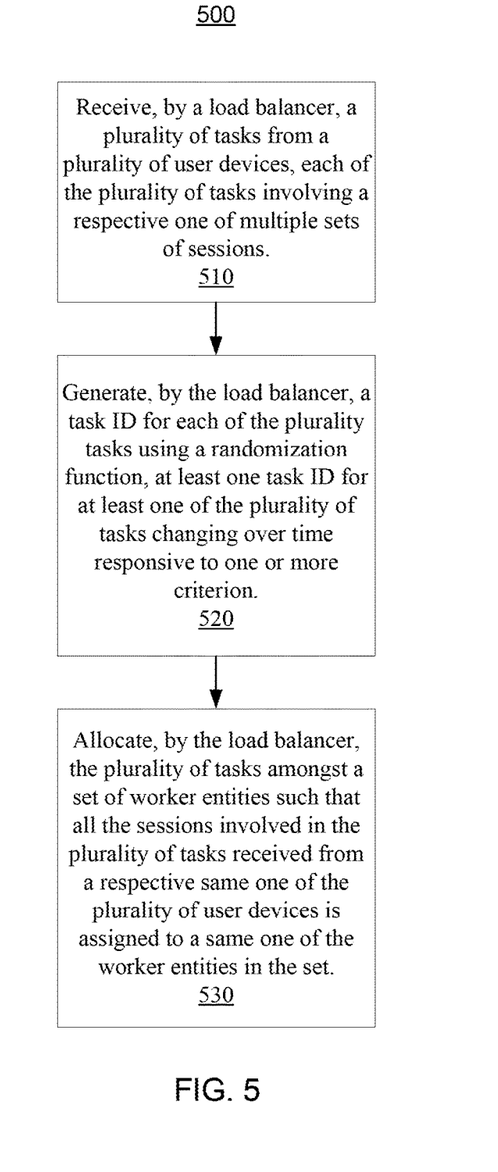
FIG. 5 is a flow diagram illustrating a method for load balancing in a network, in accordance with an embodiment of the present invention.

Referring to FIG. 5, a flow chart for a method 500 of load balancing is illustratively shown, in accordance with an embodiment of the present invention. It is to be appreciated that the steps of method 500 are performed on network 100. In block 510, receive, by a load balancer, a plurality of tasks from a plurality of user devices, each of the plurality of tasks involving a respective one of multiple sets of sessions. In block 520, generate, by the load balancer, a task ID for each of the plurality tasks using a randomization function, at least one task ID for at least one of the plurality of tasks changing over time responsive to one or more criterion. In block 530, allocate, by the load balancer, the plurality of tasks amongst a set of worker entities such that all the sessions involved in the plurality of tasks received from a respective same one of the plurality of user devices is assigned to a same one of the worker entities in the set.

In another embodiment, to avoid storage of a routing table, a load balancer only relies on a table of the HASH value intervals that define the span of HASH values for all workers. In order to route a session within a task to the correct worker, session IDs will be used in the following manner. First, depending on the type of the session ID, the session ID will be de-randomized using the correct key. Next, the pTEID from the session ID will be extracted and encoded into a HASH value using a randomization algorithm. Based on the table of HASH value intervals, the session is routed to the worker responsible for this task or UE.

In yet another embodiment, a randomization function may map from a set S to itself such that, given any number of input and corresponding output pairs of the function, the output of the next input that is different from all known inputs cannot be derived. A randomization function with a key is a randomization function for almost every key in the key range. Furthermore, if the function is known and some input and their corresponding output pairs are also known, the complexity of finding the key is of almost the same order as an exhaustive search of the entire key space.

The randomization function may have a binary input number of size B-bits as an input and generates an output of the same size. A randomization function has the following properties:

It provides a unique and reversible B-bits output for every input of size B-bits (it is a one-to-one function);

The function is easy to compute;

The reverse function is also easy to compute if the key is known;

The function is highly nonlinear, so the key will be hard to guess by an adversary;

The complexity of finding the key should be of the order of $2^C$ evaluations of the randomization function, even if the function and its algorithm are completely known and an adversary has access to multiple pairs of input and outputs. Here, the key is a binary number of size C bits and usually B=C.

In one embodiment, a randomization function is to use a HAPH function that uses multiple rounds of the same algorithm with different inputs that are sequentially fed into each round. The input at any round, say r, is derived from the original input and key as well as the output of the previous rounds.

At each round r, the input bits are processed in three steps:

Bitxor: where the input sequence is XORed with the key in order to introduce confusion into the input sequence;

Substitution: where multiple bits are bound together as a binary number to form an address to a look up table and find a corresponding value at that address to replace the current value, binding the confusion introduced in the previous step between multiple bits;

Permutation: where the order of the bits is changed and the whole B-bits of the previous step are permuted, diffusing the confusion generated in the previous step by dispersing the bits into several different blocks.

The permutation step is important, since the confusion from a single block diffuses into several blocks, in the next round. For example, if only one bit in the input sequence changes, the corresponding outputs after one round cannot be different in more than the size of the substitution box that is the logarithm of number of entries in the substitution table in base 2. For example, using a substitution box of size 8. In this case, the difference between outputs is at most 8 bits, but it is usually averaged at 4 to 5 bits. However after a second round, this confusion usually spreads between the blocks and grows fast, usually in the average of 10 to 13 bits. After a third round, the confusion is about more than half of the bits in average which means that after 3 rounds the output bits would appear quite random and independent of the input sequence, even if we use the output of a simple counter as an input to HAPH function. The randomization function is a one-to-one function since all three steps of the round function are one-to-one functions.

In one embodiment, the substitution table should have very nonlinear properties and may be derived at random or designed based on multiplications in finite fields. An example of substitution table of size 256 for an 8 bit input and 8 bit output is given below in table 1.

TABLE 1

|   | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 63 | 7C | 77 | 7B | F2 | 6B | 6F | C5 | 30 | 01 | 67 | 2B | FE | D7 | AB | 76 |
| 1 | CA | 82 | C9 | 7D | FA | 59 | 47 | F0 | AD | D4 | A2 | AF | 9C | A4 | 72 | C0 |
| 2 | B7 | FD | 93 | 26 | 36 | 3F | F7 | CC | 34 | A5 | E5 | F1 | 71 | D8 | 31 | 15 |
| 3 | 04 | C7 | 23 | C3 | 18 | 96 | 05 | 9A | 07 | 12 | 80 | E2 | EB | 27 | B2 | 75 |
| 4 | 09 | 83 | 2C | 1A | 1B | 6E | 5A | A0 | 52 | 3B | D6 | B3 | 29 | E3 | 2F | 84 |
| 5 | 53 | D1 | 00 | ED | 20 | FC | B1 | 5B | 6A | CB | BE | 39 | 4A | 4C | 58 | CF |
| 6 | D0 | EF | AA | FB | 43 | 4D | 33 | 85 | 45 | F9 | 02 | 7F | 50 | 3C | 9F | A8 |
| 7 | 51 | A3 | 40 | 8F | 92 | 9D | 38 | F5 | BC | B6 | DA | 21 | 10 | FF | F3 | D2 |
| 8 | CD | 0C | 13 | EC | 5F | 97 | 44 | 17 | C4 | A7 | 7E | 3D | 64 | 5D | 19 | 73 |
| 9 | 60 | 81 | 4F | DC | 22 | 2A | 90 | 88 | 46 | EE | B8 | 14 | DE | 5E | 0B | DB |
| A | E0 | 32 | 3A | 0A | 49 | 06 | 24 | 5C | C2 | D3 | AC | 62 | 91 | 95 | E4 | 79 |
| B | E7 | C8 | 37 | 6D | 8D | D5 | 4E | A9 | 6C | 56 | F4 | EA | 65 | 7A | AE | 08 |
| C | BA | 78 | 25 | 2E | 1C | A6 | B4 | C6 | E8 | DD | 74 | 1F | 4B | BD | 8B | 8A |
| D | 70 | 3E | B5 | 66 | 48 | 03 | F6 | 0E | 61 | 34 | 57 | B9 | 86 | C1 | 1D | 9E |
| E | E1 | F8 | 98 | 11 | 69 | D9 | 8E | 94 | 9B | 1E | 87 | E9 | CE | 55 | 28 | DF |
| F | 8C | A1 | 89 | 0D | BF | E6 | 42 | 68 | 41 | 99 | 2D | 0F | B0 | 54 | BB | 16 |

The entries of the table denote hexadecimal numbers from 0x00 to 0xFF. For example, based on this table, the value 00 will map to 63 or 03 will map to 7B. Each number from 0x00 to 0xFF appears once in the table which means that the substitution is a one-to-one function and hence reversible operation.

In another embodiment, the permutation is a simple way to diffuse the confusion in randomization algorithm. For example we can use the following permutation [19, 23, 9, 25, 10, 24, 22, 11, 30, 32, 15, 8, 18, 17, 6, 14, 21, 7, 31, 4, 28, 16, 3, 29, 12, 13, 2, 1, 20, 27, 5], meaning that the first bit goes to position 19, the bit at position 2 goes to bit at position 23, etc. A permutation like [10, 21, 18, 5, 11, 2, 25, 32, 30, 23, 27, 16, 9, 4, 8, 22, 29, 26, 20, 15, 24, 14, 7, 6, 12, 17, 1, 19, 3, 31, 28, 13] has the property that it randomly maps two bits from every byte to one of the four bytes in 32 bit output. This ensures that all the 4 bytes are possibly affected, as a result of a bit change in the original input, in the next substitution.

In yet another embodiment, the permutation function may be replaced with a reversible function, e.g., multiplication in finite fields. This means that a change in a bit in say b-th byte in the input affects the output of the b-th byte in the substitution step and it may affect almost any bits after multiplication in this step. The difference between multiplication and permutation is that with the permutation, after the b-th byte is affected, at most all the 8 bits in the substitution step have been changed and it means that after the permutation, only 8 possible bits in different positions are changed. One approach in multiplication is to multiply the entire word of 4 bytes by an invertible 4×4 matrix in finite field $GF(2^8)$ given a characteristic polynomial. This could be an MDS matrix in order to generate maximum diffusion of the confusion. An example of such multiplication is given by $$\begin{bmatrix} b_0 \\ b_1 \\ b_2 \\ b_3 \end{bmatrix} = \begin{bmatrix} 2 & 3 & 1 & 1 \\ 1 & 2 & 3 & 1 \\ 1 & 1 & 2 & 3 \\ 3 & 1 & 1 & 2 \end{bmatrix} \begin{bmatrix} a_0 \\ a_1 \\ a_2 \\ a_3 \end{bmatrix}$$

Where a0 to a3 are the four input bytes and b0 to b3 are the four output bytes. All multiplications are done in $GF(2^8)$ with irreducible polynomial $x^8 \pm x^4 + x^3 + x + 1$. The inverse operation is done by similar multiplication as follows $$\begin{bmatrix} r_0 \\ r_1 \\ r_2 \\ r_3 \end{bmatrix} = \begin{bmatrix} 14 & 11 & 13 & 9 \\ 9 & 14 & 11 & 13 \\ 13 & 9 & 14 & 11 \\ 11 & 13 & 9 & 14 \end{bmatrix} \begin{bmatrix} a_0 \\ a_1 \\ a_2 \\ a_3 \end{bmatrix}$$

Figure 6:
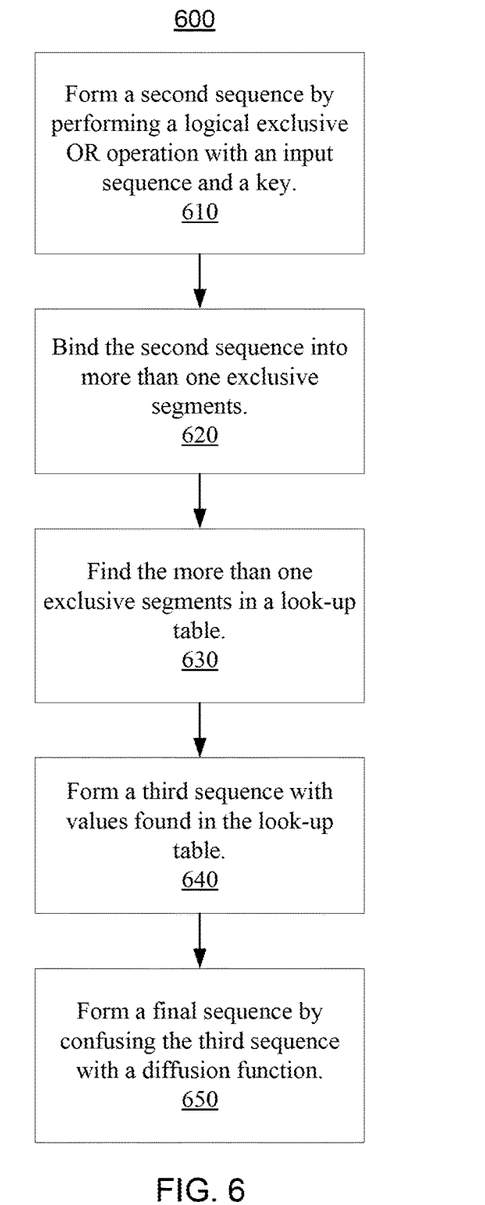
FIG. 6 is a flow diagram illustrating a method for randomization in a load balancer in a network, in accordance with an embodiment of the present invention.

Referring to FIG. 6, a flow chart for a method 600 of randomization on a load balancer 140 is illustratively shown, in accordance with an embodiment of the present invention. It is to be appreciated that the steps of method 600 are performed by the load balancer 140 on network 100. In block 610, form a second sequence by performing a logical exclusive OR operation with an input sequence and a key. In block 620, bind the second sequence into more than one exclusive segments. In block 630, find the more than one exclusive segments in a look-up table. In block 640, form a third sequence with values found in the look-up table. In block 650, form a final sequence by confusing the third sequence with a diffusion function.

In one embodiment, a randomization function is devised as several rounds, each round of the randomization function is invertible, meaning the input of the round can be found from the output. However, the round may be comprised of several steps but it is not necessary for all the steps to be invertible or one-to-one function. An example of such strategy is given by a Feistel network.

The first generalization of a Feistel is given by a structure where the input and output of each round are divided into several sub-blocks (not necessarily the same size). The network provides an invertible function for a round if (1) at least one of the sub-blocks of the output (called primary sub-block) is equal to one of the sub-blocks of the input (or it has remained unchanged from the input to the output). (2) Given the knowledge of the primary sub-block, at least one of the other sub-blocks of the output is an invertible function of an input sub-block and (3) iteratively; one of the remaining output sub-blocks is an invertible function of one of the input sub-blocks given the knowledge of previously determined input sub-blocks.

The second generalization of a Feistel network is given by a structure where the input and output of each round are divided into several sub-blocks. The network provides an invertible function for a round if (1) at least one of the sub-blocks of the output (called primary sub-block) is an invertible function of one or more sub-blocks of the input; (2) at least one of the other sub-blocks of the output (called secondary sub-block) is an invertible function of one or more input sub-blocks given the primary sub-block; and (3) iteratively, one of the remaining sub-blocks of the output (the k-tiary sub-block) is an invertible function of one or more input sub-blocks given all prior primary, secondary, . . . , and (k−1)-tiary sub-blocks.

An example of second generalization of a Feistel network is given as follows. Let the input of the k-th round be given by two sunblock L_k and R_k and the output be given by L_(k+1) and R_(k+1) that are input to the next round. Let L_(k+1)=L_k BitXor R_k, while R_(k+1)=R_k BitXor F(K_k, L_(k+1)), where F could be a one way function. Other example is L_(k+1)=L_k multiply R_k, where 'multiply' is defined as a finite field and R_(k+1)=R_k BitXor F(K_k, L_(k+1)), where F could be a one way function. We note that multiply can be defined in a finite field, e.g., $GF(2^n)$ by using a prime polynomial or it can be defined in GF(p) where p is a prime number. In this case, e.g., if $2^n+1$ is a prime number multiplication defined as $GF(2^n+1)$ and zero is omitted from the input and output values, while all zero input is considered $2^n$ and $2^n$ in the output is represented by all zero. For example if each sub-block is a byte, then $GF(2^8+1)=GF(257)$ exist since 257 is a prime number and this multiplication can be easily defined.

We notice that in the second generalization of a Feistel network, the value of none of the output sub-blocks is equal to that of any of the input sub-blocks. Moreover, any given output sub-bock is a possible function of multiple input sub-blocks.

The third generalization of a Feistel network is even more interesting in that not only all the output sub-blocks are different from input sub-blocks, none of the output sub-blocks are a primary sub-block which means that given these output sub-blocks there is an input sub-block that is invertible from at least one output sub-block. In this generalization, there exist a function of some output sub-blocks that is equal to a function of some input sub-blocks and this function is the 'primary generator'. Given this primary generator an input sub-block becomes an invertible function of an output sub-block, where this sub-block is called the secondary generator. A k-tiary generator is defined based on previously defined generators.

An example of the third generalization of a Feistel network can be given as follows. Let A_k,B_k,and C_k, . . . define the sub-blocks of k-th round. Let M=A_k/B_k mod GF(2^8+1) as described before. Let a one way function of M XOR C_k define one of the outputs, say C_(k+1), a one way function of C_k multiply by A_k mod GF(2^8+1) defines another output sub-block, say A_(k+1) and the same one way function of C_k multiply by B_k mod GF(2^8+1) defines the third output sub-block, say B_(k+1). We note that all sub-blocks are concurrently changed and none of them is a primary sub-block. However, there exist a function that remains 'literal' between input and output. We say a function of input sub-blocks is 'literal' if there exists a function of output sub-blocks that is identical to it. We note that the function A_k/B_k mod GF(257) is literal since it is identical to the value of the function A_(k+1)/B_(k+1) mod GF(257).

We note that two literal functions do not necessarily have the same form. For example, let M=A_k/B_k mod GF(2^8+1) as defined above. Let a one way function of M XOR C_k define one of the outputs, say C_(k+1), a one way function of C_k multiply by A_k mod GF(2^8+1) defines another output sub-block, say A_(k+1) and the same one way function of C_k divided by B_k mod GF(2^8+1) defines the third output sub-block, say B_(k+1). We note that the function A_k divided by B_k mod GF(257) is literal since it is identical to the value of the function A_(k+1) multiply by B_(k+1) mod GF(257).

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A load balancing device, comprising:
 a processor configured to:
  receive a plurality of tasks from a plurality of user devices, each of the plurality of tasks involving a respective one of multiple sets of sessions;
  generate a task ID for each of the plurality tasks using a randomization function, at least one task ID for at least one of the plurality of tasks changing over time responsive to one or more criterion; and
  allocate the plurality of tasks amongst a set of worker entities such that all the sessions involved in the plurality of tasks received from a respective same one of the plurality of user devices is assigned to a same one of the worker entities in the set;
 wherein to generate the task ID for each of the plurality of tasks using the randomization function, the processor is configured to:
  form a second sequence by performing a logical exclusive OR operation with an input sequence and a key;
  bind the second sequence into more than one exclusive segments;
  find the more than one exclusive segments in a look-up table;
  form a third sequence with values found in the look-up table; and
  form an output sequence by confusing the third sequence with a diffusion function.

2. The load balancing device of claim 1, wherein to perform the diffusion function, the processor is configured to reorder the third sequence with a bit reorder sequence that remaps the location of the bits based on one or more different criterion.

3. The load balancing device of claim 1, wherein to perform the diffusion function, the processor is configured to perform a multiplication in finite fields on the third sequence.

4. The load balancing device of claim 1, wherein the randomization function is selectively iteratively repeated based on one or more different criterion, such that the output sequence of a particular iteration of the randomization function is the input sequence for a following iteration of the randomization function.

5. The load balancing device of claim 4, wherein the following iteration of the randomization function uses a different key than the particular iteration of the randomization function.

6. A method, comprising:
receiving, by a load balancer, a plurality of tasks from a plurality of user devices, each of the plurality of tasks involving a respective one of multiple sets of sessions;
generating, by the load balancer, a task ID for each of the plurality tasks using a randomization function, at least one task ID for at least one of the plurality of tasks changing over time responsive to one or more criterion; and
allocating, by the load balancer, the plurality of tasks amongst a set of worker entities such that all the sessions involved in the plurality of tasks received from a respective same one of the plurality of user devices is assigned to a same one of the worker entities in the set;
wherein the randomization function is comprising:
forming a second sequence by performing a logical exclusive OR operation with an input sequence and a key;
binding the second sequence into more than one exclusive segments;
finding the more than one exclusive segments in a look-up table;
forming a third sequence with values found in the look-up table; and
forming an output sequence by confusing the third sequence with a diffusion function.

7. The method of claim 6, wherein the diffusion function includes remapping the location of bits in the third sequence based on one or more different criterion.

8. The method of claim 6, wherein the diffusion function includes a multiplication in finite fields function.

9. The method of claim 6, wherein the randomization function is selectively iteratively repeated based on one or more different criterion, such that the output sequence of a particular iteration of the randomization function is the input sequence for a following iteration of the randomization function.

10. The method of claim 9, wherein the following iteration of the randomization function uses a different key than the particular iteration of the randomization function.

* * * * *